METHOD OF AND SYSTEM FOR STORING DATA MAGNETICALLY

Filed April 20, 1955 3 Sheets-Sheet 1

INVENTORS
Lowell S. Bensky,
David L. Nettleton &
Arthur D. Beard
BY Morris A. Rabkin
ATTORNEY

METHOD OF AND SYSTEM FOR STORING DATA MAGNETICALLY

Filed April 20, 1955 3 Sheets-Sheet 2

INVENTORS
Lowell S. Bensky,
David L. Nettleton &
Arthur D. Beard
BY Morris Rabkin
ATTORNEY Feb. 23, 1960 L. S. BENSKY ET AL 2,926,338

METHOD OF AND SYSTEM FOR STORING DATA MAGNETICALLY

Filed April 20, 1955 3 Sheets-Sheet 3

INVENTORS
Lowell S. Bensky,
David L. Nettleton &
Arthur D. Beard
BY Morris [signature]
ATTORNEY United States Patent Office 2,926,338

Patented Feb. 23, 1960

2,926,338

METHOD OF AND SYSTEM FOR STORING DATA MAGNETICALLY

Lowell S. Bensky, Levittown, Pa., and David L. Nettleton and Arthur D. Beard, Haddonfield, N.J., assignors to Radio Corporation of America, a corporation of Delaware Application April 20, 1955, Serial No. 502,647

12 Claims. (Cl. 340—174)

This invention relates to data storage systems, and particularly to a method of and system for storing data magnetically.

Many of the present data (information) handling systems employ data storage units. This stored data is generally handled by some type of computer. A program control unit of the computer controls the flow of information into, within, and out of the computer. The stored information may be in the form of characters, each comprising a group of coded binary signals.

In many of these systems, it is desirable to store information for various periods of time and yet have the information readily available for reading or alteration. Storing the characters of information on a magnetic drum, or on a continuous strip of material which is rotatable at a high rate of speed or on other cyclic storage media is a solution to this problem. The desired information can then be located and read off into the computer or other information handling device as needed.

It is accordingly desirable to store, that is pack, the information as tightly as possible on such cyclic media in order to store a maximum amount of information within a given area. It is also desirable to cycle the drum, or other storage member, as rapidly as possible to achieve a minimum access time to any desired information location. Access time may be defined as the time interval between the instant certain data is called for and the instant at which that data is derived from the storage unit. These two requirements are not always compatible with either the storage unit itself or the data handling system itself. Thus, many data handling systems are only capable of handling the characters of information at fixed time rates. As both the amount of information stored within a given area, and the speed of rotation of a drum, for example, are increased, the time interval between successive characters on the drum is decreased until a point is reached at which the maximum operating speed of the information handling system is exceeded.

To achieve compatibility between the operating speed of the information handling system and that of the cyclic data storage unit itself, the latter unit must be either cycled at a lower rate thereby increasing access time, or the packing density of the information decreased. Generally, it is not desirable to increase the access time. Accordingly it is apparent that the packing density of information on a magnetic drum must be decreased thereby causing the drum to be inherently wasteful of storage area. This same philosophy is applicable to other cyclic data storage systems and mediums.

Accordingly, it is an object of this invention to provide an improved system which system is capable of storing a greater amount of information within a given storage medium.

Another object of this invention is to provide an improved system for storing information which system provides a shorter access time to the information.

Another object of this invention is to provide a method making more efficient use of a cyclical storage medium.

Still another object of this invention is to provide an improved system for temporarily storing data for use in information handling devices, which system provides for a more efficient use of the storage medium in conjunction with the device in which it is employed.

A still further object of this invention is to provide a method and means of more efficiently storing data for use with computing devices on a given medium so that any portion of the data will be readily available for recording, reading, and alteration.

Still another object of this invention is to provide a system for recording, reading and altering a maximum amount of data on a given moving member in such a manner that any portion of the data will be available for either recording, reading or alteration in a minimum amount of time.

An additional object of this invention is to provide an improved system of matching the reading out rate of a data storage device with that of an information handling system.

An added object of this invention is to provide an improved device for generating sequential pulses on successive parallel channels in response to multiples of a synchronizing signal, which device is more accurate and economical of equipment than those heretofore known.

In accordance with a preferred embodiment of the invention, synchronizing pulses derived from the timing track of a magnetic drum storage device are applied to a timing pulse generator. This timing pulse generator functions to control the basic timing rate of an information handling system, which includes the drum, and to generate two series of four timing pulses each, for a total of eight. Each sequence of eight timing pulses is generated upon the occurrence of every other synchronizing pulse from the magnetic drum timing track. With the information handling system under the control of this basic timing cycle which occurs with each alternate drum line, the timing pulse generator allows alternate lines to be read from the drum. The drum may then be cycled at whatever rate the information handling device can properly respond. At the same time, the drum may be packed with information solidly. In this manner substantially twice as much information may be packed on the drum and used in a highly efficient manner as would be possible without this arrangement.

In accordance with another feature of this invention, a particular drum line may be selected without loss of access time by suppressing the second group of four timing pulses and generating a group of four timing pulses in response to every drum line. In this manner, each drum line in succession may be counted until a selected drum line occurs.

The novel features of this invention as well as the invention itself both as to its organization and method of operation will best be understood from the following description when read in connection with the accompanying drawings, in which like reference numerals refer to like parts in which.

Figure 1:
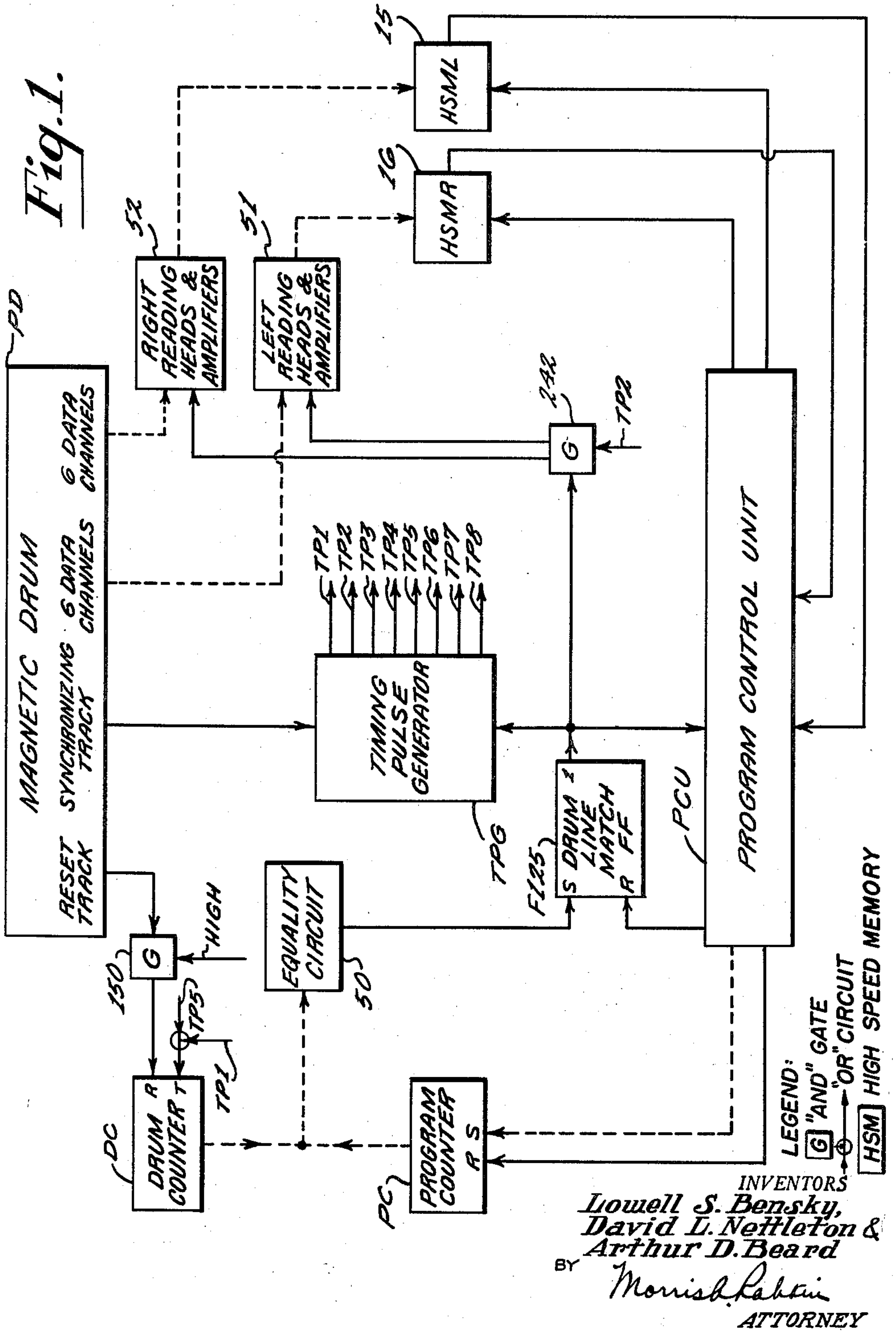
Figure 1 is a block diagram showing a manner in which this invention may be used in conjunction with a typical information handling system.

The present invention is embodied in a system which is more fully described in a copending application entitled "Information Handling System," Serial Number 478,021, filed December 28, 1954, by the applicant, Lowell S. Bensky. It may be noted that several of the components bears similar designations and the same reference numerals as the similar components in the drawing and specification of the said Bensky application. The said Bensky application describes an information handling system in detail including the various operations, among which is the technique of using alternate drum lines to pack a greater amount of information upon a program drum in the system. The present invention is also described in a copending application entitled "Information Handling Devices," Serial Number 478,022, filed December 28, 1954, by Sublette et al. The said Sublette application describes a method and system for reading information from tape, drum or other storage media into a high speed type memory. The present application shows the information handling system described in the said applications in an abbreviated form, including only so much as to provide a clear and ready understanding of the present invention.

The data upon which the computer acts may be stored in a static memory which, by way of example, may comprise two banks designated respectively, the left high speed memory 15 and the right high speed memory 16 (see Fig. 1). Hereafter, the abbreviation HSM is employed for high speed memory. Each memory bank may be of the type employing magnetic cores and may be assumed to include read-out and read-in circuits which may be respectively actuated by pulses or high levels. On the occurrence of a pulse at the appropriate circuit the memory is placed in condition and thus receives information applied thereto at its information-in circuits or supplies information at its information-out circuit. The information-in or out is in the form of binary digits of information, or bits, each represented by the pulses (or voltage level) on one of several leads. Seven bits in this instance may be stored at each address and written in or read out in parallel. However, one of these seven bits is a parity bit, and is ignored in describing the present invention.

As will appear more fully hereinafter, a series of timing (that is, clock) pulses are provided in cycles of approximately twenty microseconds. It is assumed that the read-in and read-out circuits although actuated are further actuated internally only upon the occurrence of a timing pulse designated TP5. Information may be received or fed out of the memory throughout the period from timing pulse TP5 to timing pulse TP6.

A program drum PD is supplied in a known manner with a timing track and a reset track. Program drum PD is preferably a magnetic drum continuously rotated. As the drum rotates, pulses are generated in reading heads (or other transducing means) from the timing track in synchronism with lines of information written on the drum in the form of binary numbers magnetically stored in twelve data channels. With the occurrence of every other pulse from the timing track, timing pulse generator TPG generates a series of eight timing pulses designated as TP1 to TP8 respectively. The particular manner of generation of timing pulses will be described more fully in conjunction with the explanation of Fig. 2 and especially the manner whereby every alternate pulse from the timing track is suppressed. This latter feature provides a unique method of line interlace, whereby greater compression of the information on the drum may be obtained. The reset track on the program drum PD provides a single fiducial pulse from which the lines on the drum are counted.

Six of the data channels on the program drum PD are read by six left reading heads and amplifiers 51 and the other six data channels are read by six right reading heads and amplifiers 52. A gate 150 receives the pulse from the reset track of the program drum PD and applies it to the reset terminal R of the drum counter DC. The gates herein are all logical "and" gates and are indicated by rectangles, with the priming leads directed toward the rectangle and the output leaving the rectangle. The gate 150 is a two-input gate. In addition to the input from the reset track, another input is indicated which for the purpose of the present aplication may be considered always high and the gate therefore always open.

The drum counter DC may be a counter of nine stages. Each of the counters and registers herein may be flip-flop counters or registers. The trigger terminal T of the drum counter DC receives the output of an "or" circuit. This "or" circuit is provided with two inputs. One, the first timing pulse TP1 and the other the fifth timing pulse TP5. In the drawing in this application, as in the Bensky application, a special convention is adapted for the showing of an "or" circuit. According to this convention, the inputs to the "or" circuit are indicated by arrowheads converging to a point which is the center of a small circle. A single line from the center of this circuit indicates the output.

A program counter PC is provided having nine flip-flop stages. The outputs of the program counter PC are applied to inputs of an equality circuit 50. Other inputs of the equality circuit 50 are from the flip-flop stages of the drum counter DC. A flip-flop is a circuit having two stable states, that is, conditions, and two input terminals, one of which is designated as set and the other of which is designated as reset. The flip-flop may assume the set condition by application of a high level or pulse on the set input terminal S, or the reset condition by application of a high level or pulse on a reset terminal R. Two outputs are associated with the output circuit which are given Boolean tags of one and zero. If the flip-flop is in its set condition, that is "set," the one output voltage is high and the zero output voltage is low. Unless otherwise indicated, the outputs from flip-flops are taken from the one terminal. If the flip-flop is reset (that is, in its reset condition) the one terminal is low and the zero terminal is high. A flip-flop may also be provided with a trigger terminal T. Application of a pulse to the trigger terminal T causes the flip-flop to assume the other condition from the one it was in when the pulse was applied. Counters are formed from flip-flops in a known manner.

In this application, multiple leads are indicated by dotted lines. Each lead of these multiple leads carries, as the machine operates, a binary digit of information having only two possible voltage levels, one high and one low. These voltage levels may be either a constant voltage or in the form of pulses. Therefore, the lines themselves are sometimes designated as bits (binary digits of information). The equality circuit 50 may comprise a group of "and" gates. There are two "and" gates for each corresponding stage of the two counters, one "and" gate being for each pair of corresponding leads. The outputs of each pair of "and" gates corresponding to each of the stages, respectively, of the counters are supplied (in pairs) through "or" circuits to a single "and" gate (not shown). Accordingly, the equality circuit 50 has a pulse output, if, and only if, the binary number in the program counter PC is the same as the binary number in the drum counter DC.

The output of the equality circuit is connected to the set input S of a single drum line match flip-flop F125. The reset input R of the drum line match flip-flop F125 is received from what is herein broadly termed a program control unit PCU. Note that this PCU does not correspond exactly with the PCU of Fig. 1 of the said Bensky application. The program control unit may include an arithmetic unit and controls the flow of data between the high speed memories 15 and 16 and itself. The arithmetic unit includes an adder. The program control unit can thus control the flow of data to perform logical operations as addition, subtraction, multiplication, etc., on the data in the high speed memory. Further, the program control unit PCU is connected to the set input of the program counter PC and functions to supply the address of the information desired on the magnetic drum PD. As is indicated by the dotted line, this address is supplied on parallel channels to the program counter. In addition, the program control unit supplies a reset pulse to the reset input R of the program counter. It should be noted that the drum address may also be set into the program counter by a keyboard arrangement and the program counter reset by a D.C. switching voltage. Likewise, the drum line match flip-flop F125 may be reset in the same manner as the program counter PC.

The timing pulse generator receives the one output of the drum line match flip-flop F125 as do the program control unit PCU and a gate 242. The function of this input to the timing pulse generator from the drum line match flip-flop F125 is to control whether the timing pulse generator TPG generates (1) a sequence of eight timing pulses in response to each alternate pulse received from the timing track of the program drum PD or (2) a sequence comprising only the first four of these timing pulses in response to every succeeding synchronizing pulse received from the timing track. A second input to the gate 242 is completed by the timing pulse TP2. The output of the gate 242 is connected to prime the left and right reading heads and amplifiers 51 and 52.

In operation, a particular program drum address may be set up in the program counter PC. With the drum line to match flip-flop F125 reset, gate 242 will prevent the reading heads 51 and 52 from reading any information from the drum PD. After the reset track has reset the drum counter DC, successive synchronizing pulses from the timing track cause the timing pulse generator TPG to generate sequences of four timing pulses TP1 to TP4 inclusive. Each TP1 advances the drum counter DC by one. Upon reaching equality with the drum address set up in the program counter PC, the drum line match flip-flop F125 is set, thereby creating a high level output to the timing pulse generator TPG and gate 242. This high level allows the reading heads 51 and 52 to read the magnetic drum PD every TP2. In addition, the mode of operation of the timing pulse generator is shifted to generate eight timing pulses (TP1 to TP8 inclusive) in response to every alternate synchronizing pulse. Accordingly, since the reading heads are actuated only during TP2, alternate drum lines are read, whereas every drum line is searched before the proper count is attained. The reading of only alternate drum lines allows a faster drum rotation, thereby decreasing access time over that of a drum wherein every line is read.

Figures 2, 3:
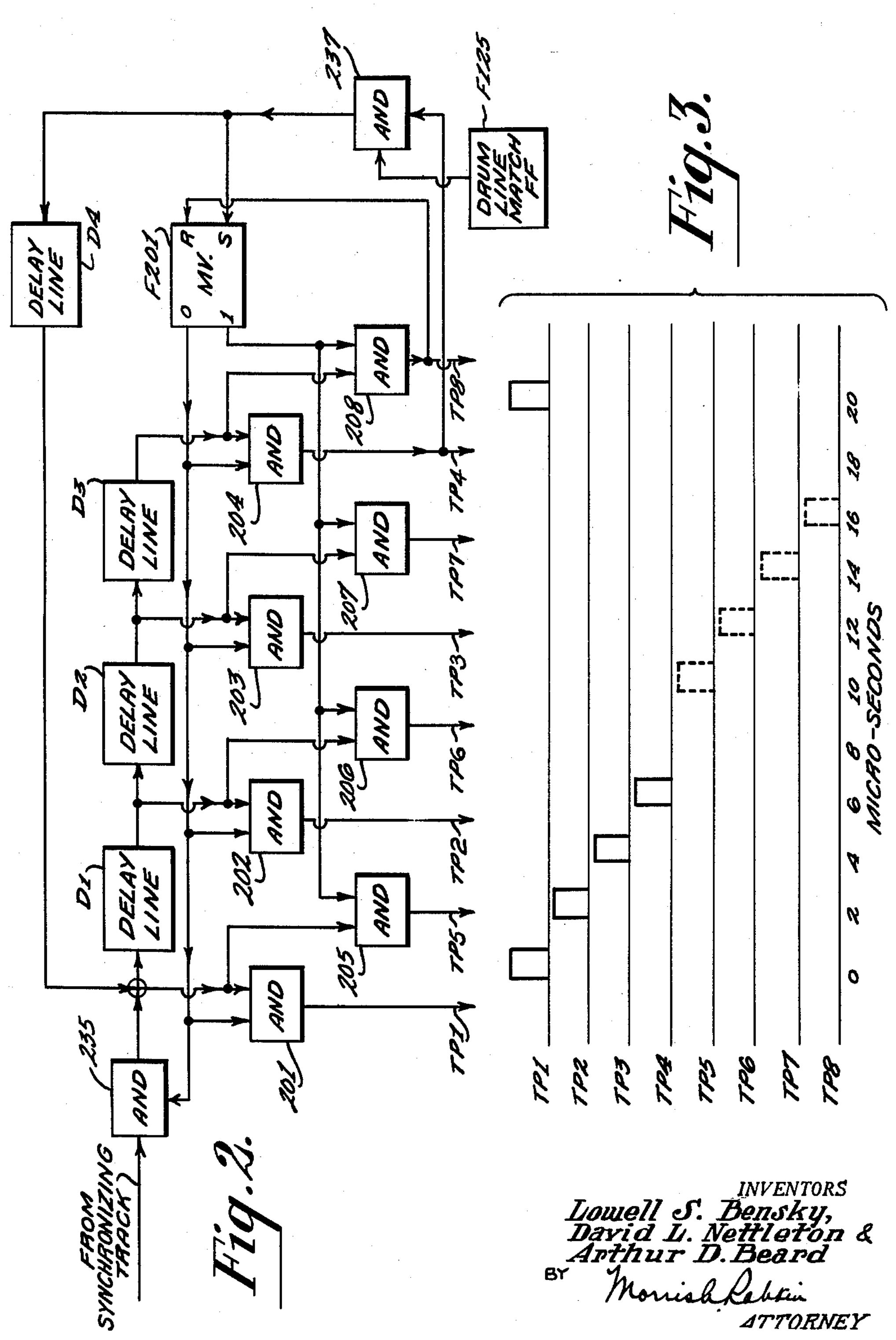
Figure 2 is a block diagram of the timing pulse generator employed in Figure 1, in accordance with a preferred embodiment of this invention.
Figure 3 illustrates the time distribution of the timing pulses produced in accordance with the embodiment of this invention as shown in Figure 2.

Since a specific function of the computing system is not the subject of the present invention, any further explanation as to the specific functions of the computer as such are deemed superfluous. The specific circuitry of a preferred embodiment of a timing pulse generator TPG which may be employed to accomplish this invention is shown in Fig. 2. Referring now to Fig. 2, the input to the timing pulse generator TPG from timing track of the program drum PD is connected through a coincidence gate 235 to a group of serially connected delay lines D1, D2, and D3. Delay lines are well known in the art and may, for example, be comprised of a plurality of LC sections.

The output from the drum timing track (actually from the coincidence gate 235) and the outputs of each of the delay line sections D1, D2, and D3 are coupled to corresponding ones of the first of two inputs of a first group of coincidence gates 201, 202, 203, and 204, respectively. In addition, these outputs from the timing track and the several delay lines D1, D2, and D3 are also coupled to corresponding ones of the first of two inputs of a second group of coincidence gates 205, 206, 207, and 208. The output of each coincidence gate, in both the first and second groups of gates, are indicated by arrows. The outputs from the first group of coincidence gates ("and" gates) are herein respectively labeled TP1, TP2, TP3, and TP4, and those from the second group of "and" gates respectively TP5, TP6, TP7, and TP8. These eight parallel channels supply sequential timing pulses to a utilization device, herein illustrated by the control unit PCU of the information handling device shown in Figure 1.

The output of the last-in-time "and" gate 204 of the first group of "and" gates 201, 202, 203, and 204 (that is, timing pulse TP4) is connected to the first input of a two input "and" gate 237. The output of "and" gate 237 is connected to the set input of a commutating flip-flop F201. The second input to "and" gate 237 may be provided by a high or low level voltage, by way of illustration, from the drum line match flip-flop F125 as illustrated in Figure 2. This second input to the "and" gate 237, as before, may be designated as a priming input. In a similar manner, the output of the last-in-time "and" gate 208 of the second group of "and" gates 205, 206, 207, and 208 (that is, timing pulse TP8) is coupled to the reset input of the commutating flip-flop F201. The zero, that is reset, output of the commutating flip-flop F201 is connected to the second input of each one of the first group of "and" gates 201, 202, 203, and 204 respectively, and to the second input of "and" gate 235. Because of its mode of operation, the second input of each "and" gate is designated herein as the priming input. The set (termed "one") output of the commutating flip-flop F201 is connected to the second (priming) input of each one of the second group of "and" gates 205, 206, 207, and 208. The output of "and" gate 237 is connected through a delay line D4 to the common input of the first delay line D1 and the corresponding "and" gates 201 and 205 of the first and second groups of "and" gates respectively.

This timing pulse generator constitutes an improvement over a pulse generator described in a copending application of Martin Kaplan for "Pulse Generator," Serial Number 502,572, filed concurrently herewith.

The operation of the timing pulse generator may best be understood by referring to Figure 3, wherein the time sequence of the timing pulses TP1 through TP8, inclusive, is illustrated. Let us assume that the pulses herein illustrated as from the drum timing track produce a synchronizing, that is clock, pulse every ten microseconds, and that the delay line sections D1, D2, and D3 each provide a delay of two microseconds. Under these conditions, the several pulses are introduced from the several points on the delay lines D1, D2, and D3 to the several gates at two microsecond intervals. Assume, for the moment, that the voltage level on the input to "and" gate 237 herein shown to be from the drum line match flip-flop F125 is high. With the commutating flip-flop F201 in a reset condition (that it, the reset output is high) and therefore the priming inputs to the first group of "and" gates 201, 202, 203, and 204, inclusive, along with "and" gate 235 are energized. The synchronizing pulses from the timing track will now appear at each of the corresponding pairs of "and" gates 201—205, 202—206, 203—207 and 204—208 comprising the first and second groups of "and" gates respectively in sequence. The presence of the priming input to the first group of "and" gates 201 through 204 inclusive allows the pulses to pass as they arrive, thereby generating TP1, TP2, TP3, and TP4 at two microsecond intervals.

Upon the occurrence of the TP4 pulse, "and" gate 237 passes an impulse to the commutating flip-flop F201 thereby setting flip-flop F201 to prime the inputs of each of the second group of "and" gates 205, 206, 207, and 208 inclusive. The first group of "and" gates 201, 202, 203, and 204 inclusive, as well as "and" gate 235, now have a low level priming input and thus do not pass any signals. The impulse to the commutating flip-flop F201 from "and" gate 237 also passes through delay line D4 to the input of the chain of delay lines. Accordingly, the TP4 pulse, passing through the delay line D4, generates a second series of timing pulses TP5, TP6, TP7, and TP8 in sequence. Upon the advent of the eighth timing pulse TP8 the commutating flip-flop F201 is reset, thereby priming the first group of "and" gates 201, 202, 203, and 204, inclusive, simultaneously with "and" gate 235, preparatory to the receipt of the next alternate synchronizing pulse from the drum, which latter pulse now starts the sequence over again.

In another mode of operation, the priming input to "and" gate 237 herein illustrated as from the drum line match unit flip-flop F125 is low. The TP4 timing pulses do not pass to set the commutating flip-flop 201. Accordingly, the timing pulse generator generates only the first four timing pulses TP1 to TP4, inclusive. A particular usage of this alternative mode of operation has been briefly set forth above, as in the search operation for a particular drum address.

The pulse generator of Fig. 2 may be employed in an information handling system utilizing a cyclic storage device as now set forth in greater detail with reference to Fig. 1. The first synchronizing pulse from the timing track (distinguish from the first timing pulse TP1) following the reset (that is, index or fiducial) pulse from the reset track of the magnetic drum PD, is passed to the timing pulse generator TPG to become the first timing pulse TP1. The fiducial (that is, index pulse) from the magnetic drum PD passing from the gate 150 resets the drum counter DC. (Subsequently, the remaining timing pulses through TP5, TP6, TP7, and TP8 are varied in the manner described above in response to this first synchronizing pulse from the timing track.) With the occurrence of the first set of timing pulses TP1 through TP4 after the index pulse (assuming that the input to the timing pulse generator from the drum line match flip-flop F125 is low), the count of the drum counter DC is advanced by one pulse. The first timing pulse TP1 is applied to the first trigger terminal T (of the lowest order stage) of the drum counter DC. The count of the drum counter DC is now advanced in like manner for each drum line, each of which parallels each record pulse which passes under the drum heads.

Assume, for example, that the program counter PC had previously been set by the program control unit PCU to the desired number (that is, count) of the drum line desired to be read out. The comparison circuit 50 compares each bit of information previously entered in the previous flip-flop of the program counter PC with the corresponding ones of the drum counter DC. The equality circuit 50 may be a group of "and" gates and "or" gates, arranged to have a high output, if and only if the two binary numbers, one from the drum counter DC and the other from the program counter PC, are equal.

Accordingly, when the count previously set in the program counter PC corresponds to that in the drum counter DC, the equality circuit sets the drum line match flip-flop F125. The flip-flop F125 thereby primes "and" gate 237 (Fig. 2) of the timing pulse generator as well as gate 242 and the program control unit. The primed reading heads and amplifiers 51, 52 now read out or read in the six bits of information from each of the two information channels on the program drum PD. The particular functioning and disposition of this information to or from the high speed memories 15 and 16 is controlled by the program control unit.

Gate 237 (Fig. 2), now being primed, passes the fourth timing pulse TP4 to set the commutating flip-flop F201. Setting flip-flop F201 in turn primes the second group of "and" gates 205, 206, 207, and 208 and blocks the succeeding synchronizing pulse from the program drum PD. Timing pulses TP5, TP6, TP7, and TP8 result from that fourth timing pulse TP4 which is fed back to the input of the delay lines D1, D2, D3 through delay line D4. The eighth timing pulse is now applied to reset the commutating flip-flop F201 to reopen the first group of gates 201 through 204 and gate 235, and close the second group of gates 205, 206, 207, and 208. One drum record line has meanwhile passed the drum heads. Accordingly, with the last pulse occurring when the alternate lines pass the drum heads, from the timing track of the program drum PD, another first timing pulse TP1 is passed by gate 201 and a cycle of the timing pulses recurs unless a different action occurs to stop the passage of these pulses. Therefore, as every other drum line passes the reading heads a new cycle of eight timing pulses occurs. If the second timing pulse TP2 is used to gate the reading amplifier, each alternate drum line is read.

It should be noted at this point that either the pulse generator disclosed in the Kaplan application or any other pulse generator which produces sequences of timing pulses in response to alternate synchronizing pulses may be used. It is further desirable that this pulse generator be capable of generating a shorter sequence of pulses in response to every synchronizing pulse to provide for searching for a given line. In this manner the pulse generator is always at TP1 at the start of the read-in or read-out, once the proper drum line is found. One advantage of this feature is that the program control unit now keeps track or count of the amount of information read in or out, and the maintenance of this record is readily achieved by counting each starting point TP1 in the cycle of timing pulses. Regardless, however, of the pulse generator used, the result is the same. Thus the drum counter DC keeps the proper count of every record line arriving under the reading heads, and each alternate drum line is read in accordance with a computer cycle which is one-half that of which the information is available from the magnetic drum. The proper count is achieved by the drum counter DC because of the inputs on both the TP1 and TP5 timing pulses. Further, the rapidity of access from any drum line is not reduced by virtue of the slower read-out, since any drum line is still accessible in not more than one revolution of the drum. Thus, the timing pulse generator arrangement provides means whereby when a complete cycle of timing pulses is generated only certain drum lines start each cycle, and intermediate drum lines between these certain (in this instance, alternate) lines, for the current cycle are ignored. A novel manner of reducing the read-out or cycle rate and still maintaining the density of packing of information, and yet providing the same rapidity of access is thus provided.

Figure 4:
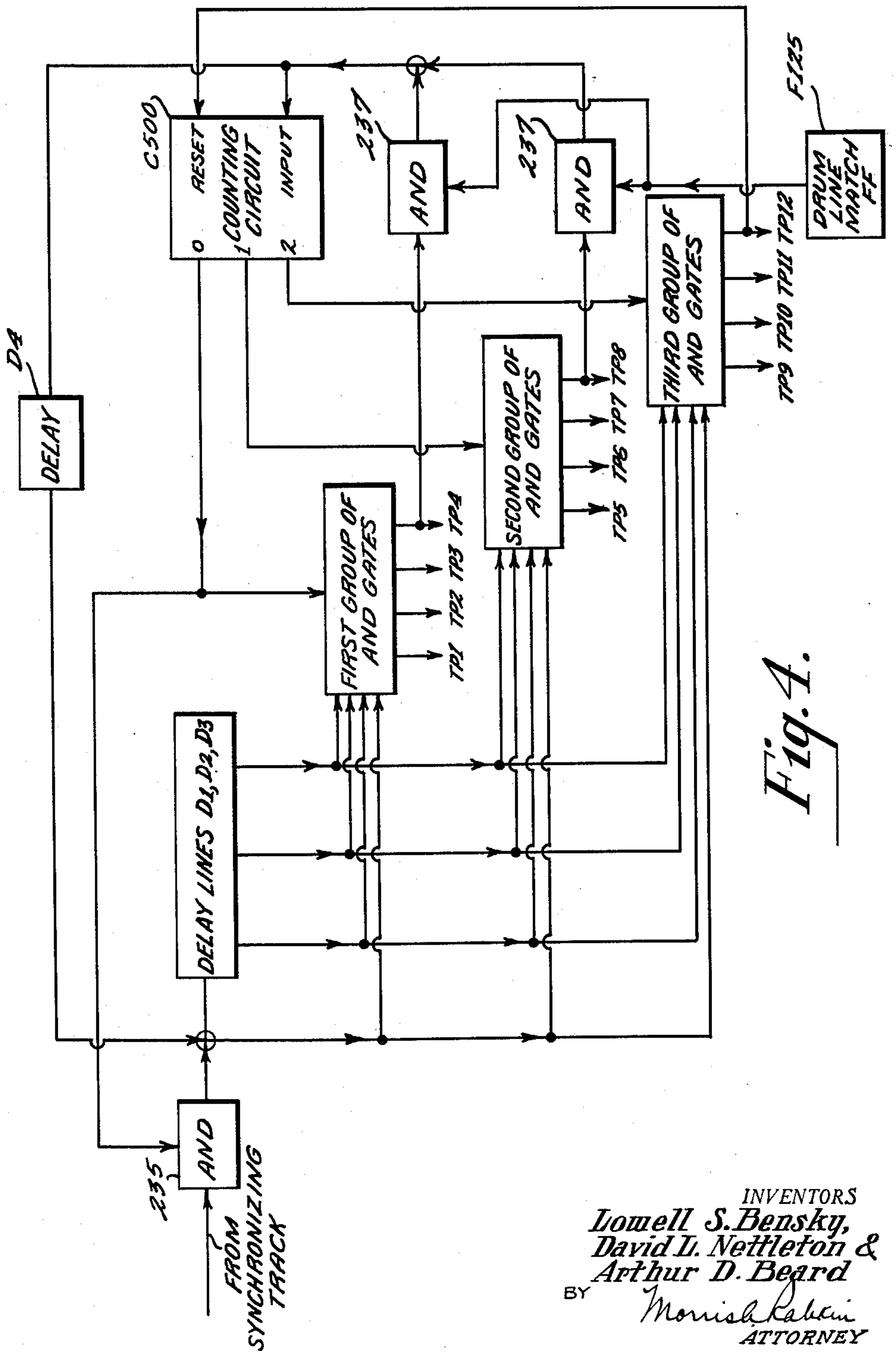
Figure 4 is a block diagram of an alternative embodiment of the timing pulse generator shown in Figure 2.

In an alternative embodiment, the principles of this invention may be extended to provide selectively varying numbers of output pulses on parallel channels. In this alternative embodiment, as shown in Figure 4, synchronizing pulses are coupled, as in Fig. 2, through an "and" gate 235 to a group of delay lines D1, D2, and D3. The outputs of "and" gate 235 and of each of the delay lines D1, D2, and D3 are applied to the inputs of each of a first, second, and third group of "and" gates (four "and" gates are assumed to comprise each group as in Fig. 2). In place of the flip-flop F202 (Fig. 2) a counting circuit C500 is employed. The "high" output of each of the 0, 1 and 2 stages of the counting circuit is utilized to prime the first, second, and third groups of "and" gates, respectively. The "high" output from the zero state of the counter C500 is also coupled to the priming input of "and" gate 235. The last-in-time pulses, TP4 and TP8, from each of the first and second groups of "and" gates, respectively, are coupled to the count input of the counting circuit C500. These timing pulses TP4 and TP8, respectively, pass through separate "and" gates 237 which are primed by the drum line match flip-flop F125 (Fig. 1). In addition to being coupled to the count input of the counting circuit C500, the timing pulses TP4 and TP8 are also coupled through delay line D4 to the input of the delay lines D1, D2, and D3. TP12 is coupled to the reset input of the counting circuit C500.

The operation of the generator of Fig. 4 is similar to that described with reference to Fig. 2. If the drum line match flip-flop F125 is low, only the first four timing pulses TP1 to TP4, inclusive, are produced. If, on the other hand, the drum line match flip-flop F125 is high (indicating the desired drum line which is utilized in conjunction with the system of Fig. 1), "and" gates 237 are opened and a sequence of twelve timing pulses are generated in response to every third synchronizing pulse. TP4 and TP8 provide the necessary input to the delay lines D1, D2, and D3 during the interval when the input synchronizing pulses are blocked by "and" gate 235. Upon the advent of the twelfth timing pulse TP12, the counter C500 is reset and the third synchronizing pulse is passed to start the cycle again. Thus, using a small number of delay lines, timing pulses can be generated in accordance with any desired multiple of synchronizing pulses. By the interlace principle, information may be read from alternate, every third, or whatever multiple of lines is desired.

There has been hereinabove described a novel method and system whereby the requirement of a minimum access time to a maximum amount of information stored in a cycle storage medium is obtained. This compatibility between requirements is obtained in a unique manner requiring a minimum amount of equipment. Further, a timing pulse generator is disclosed, which provides sequences of timing pulses on parallel channels in response to multiples of synchronizing pulses. The invention provides a means of and method for matching the information input and output rates of a cyclic storage medium (for example, a magnetic drum) to the output and input rates, respectively, of the utilization equipment.

What is claimed is:

1. In a data storage system, the combination comprising a cyclical storage means having data storage locations for storing said data, means included in said cyclical storage means to provide synchronizing signals corresponding to said data locations, means to count successive ones of said synchronizing signals, means to generate a recognition signal when said counting means has reached a predetermined count, a pulse generator for generating pulses responsive to alternate ones of said synchronizing signals, and means responsive to a selected one of said pulses to read data from interlaced and not successive locations from said cyclical storage means upon the occurrence of said recognition signal whereby more efficient use of said cyclical storage means is achieved.

2. In a data storage system of the type including a magnetic drum and having a synchronous signal track on said magnetic drum, means to read data from said magnetic drum, and means to derive synchronizing signals from said synchronizing signal track, the improvement comprising a timing pulse generator for generating timing pulses responsive to alternate ones of said synchronizing signals, a first counter responsive to a preselected number less than all of said timing pulses, a second counter for establishing a preselected count, means including an equality circuit responsive to said first counter and said second counter to generate a recognition signal when said first counter reaches said preselected count of said second counter, a drum line match flip-flop responsive to said recognition signal generating means, and means including reading heads responsive to a preselected one of said timing pulses and to the output of said drum line match flip-flop to obtain said stored data from interlaced lines of said magnetic drum whereby the access time to stored data is no more than a single drum revolution but the read-out time corresponds to more than successive ones of said synchronizing signals.

3. In a system for storing data of the type including a magnetic drum and having a synchronizing signal track displaced on said magnetic drum, means to store data upon said magnetic drum, and means to derive synchronizing signals from said synchronizing track, the improvement comprising means responsive to said synchronizing signal to generate timing pulses, means including a flip-flop counter to count certain preselected ones of said timing pulses, a program counter adapted to provide a preselected count, an equality circuit responsive to equality between said flip-flop counter and said program counter, a drum line match flip-flop responsive to said equality circuit, said timing pulse generating means being responsive to the output of said drum line match flip-flop in the event of non-equality between said flip-flop counter and said program counter to generate timing pulses in response to each one of said synchronizing signals from said magnetic drum and to suppress certain of said pulses, and means including reading heads responsive to said equality circuit in the event of equality between said flip-flop counter and said program counter and responsive to a preselected one of said timing pulses to generate said pulses without the suppression and to read data from said magnetic drum from non-successive lines thereof, whereby access is gained to any desired beginning line in a single drum revolution and read-out is accomplished from interlaced lines beginning with said desired line.

4. An information handling system comprising a magnetic drum storage device, said magnetic drum including a plurality of tracks, one of said tracks carrying synchronizing signals spaced at regular intervals, other of said tracks being adapted to carry signals representing information, means to read out said signals from each of said tracks, respectively, and means providing a plurality of timing pulses in response to alternate ones of said synchronizing signals, said information tracks read-out means operating under the control of said timing pulses to provide access to any selected line in a single drum revolution and read-out from interlaced lines starting with said selected line, whereby more information may be stored on said magnetic drum and yet all information stored may be located within a shorter access time.

5. The system as claimed in claim 4 which includes a high speed memory device connected to the output of said read out means and operating at a given time rate proportional to said synchronizing signals and under the control of one of the pulses from said timing pulse providing means, whereby the magnetic drum read-out rate is matched with the read-in rate of said high speed memory device.

6. In a system for storing information on a magnetic drum which includes a timing track to synchronize information storage locations with the drum rotation and which further includes means for deriving synchronizing pulses from said timing track, in combination, means for generating iterations of control timing pulses in response to each synchronizing pulse until a predetermined number of said synchronizing pulses are counted; means for generating iterations of control timing pulses in response to each $n$th synchronizing pulse after said count is reached, wherein $n$ is an integer greater than one; and means for reading in information to said drum in response to one of said last-named control timing pulses, whereby said information is interlaced on said drum.

7. In an information handling device including a cyclical storage means having different addresses of entry, and having a synchronizing means for producing synchronizing signals corresponding in time to said addresses, a system for searching successive addresses of said storage means for preselected ones of said addresses and reading from non-successive addresses thereof, said system comprising a timing pulse generator for generating pluralities of sequences of timing pulses, each plurality initiated by successive ones of said synchronizing signals and each sequence after the first of each plurality extending in time to overlap at least one succeeding synchronizing pulse, control means responsive to selected of said pulses to recognize said predetermined addresses, means during said searching to inhibit all but the first one of each of said timing pulse sequences whereby every information address is searched, and means for said reading under control of said pulses whereby non-successive entries are read out.

8. In an information handling device, including a magnetic drum storage means having different addresses of entry, said drum also having a synchronizing track, means to derive synchronizing signals from said synchronizing track corresponding in time to said addresses, a system for searching said magnetic drum for preselected ones of said addresses and reading thereafter, said system comprising a timing pulse generator for generating two sequences of timing pulses responsive to alternate ones of said synchronizing signals, means for reading from said addresses in response to said pulse sequences, and control means responsive to one pulse from each of said two sequences to recognize said predetermined addresses, and means during said searching to inhibit the second one of said two sequences of timing pulses, whereby every address, rather than alternate addresses, are searched but only alternate addresses are read out.

9. A system as claimed in claim 8 wherein each of said sequences of timing pulses comprises four in number and wherein said control means is responsive to the first pulse in each of said sequences.

10. A system for storing a large amount of information in a rotatable and cyclical storage medium so as to have said information available within a short access time comprising, in combination, means for rotatable and cycling said storage medium at a constant rate to provide a lower access time to information stored at any point of said cycle, means for placing portions of said information at alternate locations in said medium, means for thereafter placing other portions of said information at alternate locations interlaced between said portions of information, and means for reading out from alternate locations starting with any selected location including means for gaining access to any said selected location within a single drum revolution whereby said information is interlaced to allow a higher packing density for said storage medium and thus a quicker access time to a given location for said medium with a slower readout time.

11. In a system for storing information in a cyclical storage medium, in combination, means for producing timing signals, each corresponding to a line of information on said medium; means for providing access to any selected line of information on said storage medium in one cycle of said medium comprising means for counting each of said signals until a predetermined count is reached; pulse producing means responsive to said predetermined count for thereafter responding to each *n*th one of said timing signals; and means responsive to the last-named means for reading information out of each *n*th line on said medium, wherein *n* is an integer greater than one.

12. A system for efficiently storing information in a rotatable and cyclical storage medium so as to have said information available within a lower access time comprising, in combination, means for rotating and cycling said storage medium at a constant rate to provide a low access time to information stored at any point of said cycle, means for placing first portions of said information at cyclical locations in said medium, means for thereafter placing other portions of said information at cyclic locations in said medium interlaced between said first portions of information, and means for reading out from alternate locations starting with any selected location including means for gaining access to any said selected location within a single drum revolution.

References Cited in the file of this patent

UNITED STATES PATENTS

| | | |
|---|---|---|
| 2,067,145 | Powell | Jan. 5, 1937 |
| 2,116,173 | Judge | May 3, 1938 |
| 2,418,521 | Morton et al. | Apr. 8, 1947 |
| 2,479,880 | Toulon | Aug. 23, 1949 |
| 2,540,654 | Cohen et al. | Feb. 6, 1951 |
| 2,611,813 | Sharpless | Sept. 23, 1952 |
| 2,679,638 | Bensky et al. | May 25, 1954 |
| 2,698,427 | Steele | Dec. 28, 1954 |
| 2,845,609 | Newman et al. | July 29, 1958 |

UNITED STATES PATENT OFFICE

CERTIFICATE OF CORRECTION

February 23, 1960

Patent No. 2,926,338

Lowell S. Bensky et al.

It is hereby certified that error appears in the printed specification of the above numbered patent requiring correction and that the said Letters Patent should read as corrected below.

Column 9, line 47, for "synchronous" read -- synchronizing --.

Signed and sealed this 16th day of August 1960.

(SEAL)
Attest:

KARL H. AXLINE
Attesting Officer

ROBERT C. WATSON
Commissioner of Patents